(12) United States Patent
Chiu

(10) Patent No.: US 10,163,354 B2
(45) Date of Patent: Dec. 25, 2018

(54) QUERY SYSTEM FOR CROWDEDNESS OF BUS AND METHOD THEREOF

(71) Applicants: Inventec (Pudong) Technology Corporation, Shanghai (CN); Inventec Corporation, Taipei (TW)

(72) Inventor: Chaucer Chiu, Taipei (TW)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 16 days.

(21) Appl. No.: 15/622,916

(22) Filed: Jun. 14, 2017

(65) Prior Publication Data

US 2018/0174469 A1 Jun. 21, 2018

(30) Foreign Application Priority Data

Dec. 15, 2016 (CN) .......................... 2016 1 1163040

(51) Int. Cl.
*G08G 1/123* (2006.01)
*G08G 1/00* (2006.01)
(Continued)

(52) U.S. Cl.
CPC ............. *G08G 1/205* (2013.01); *G06F 3/048* (2013.01); *G06F 17/30112* (2013.01);
(Continued)

(58) Field of Classification Search
CPC ........ G08G 1/205; G08G 1/127; G08G 1/123; G08G 1/133; G06F 3/048;
(Continued)

(56) References Cited

U.S. PATENT DOCUMENTS 4,009,375 A * 2/1977 White ................... G07C 5/0841
340/988
4,799,162 A * 1/1989 Shinkawa ............... G08G 1/123
340/910

(Continued)

OTHER PUBLICATIONS

Sinkkonen et al., Information Server for Bus Operators, 2003, IEEE, p. 3363-6637 (Year: 2003).*

(Continued)

*Primary Examiner* — McDieunel Marc
(74) *Attorney, Agent, or Firm* — David R. Stevens; Stevens Law Group

(57) ABSTRACT

The present disclosure illustrates a query system for crowdedness of a bus and a method thereof. In the query system, a passenger may select a bus route displayed on the mobile device, to download and browse a bus dynamic message corresponding to the selected bus route, and then input and transmit a passenger pick-up request message to a server-end device, and the server-end device stores the passenger pick-up request message and calculates the numbers of passengers on the bus reaching all bus stations according to the passenger pick-up request messages of all mobile devices, and the numbers of passengers and the bus dynamic message are displayed on the passenger's mobile device at the same time. Therefore, the technical means of the present disclosure may achieve a technical effect of improving efficiency in selecting the bus to take.

10 Claims, 4 Drawing Sheets

(51) Int. Cl.
  *G07B 15/06* (2011.01)
  *G06F 3/048* (2013.01)
  *G06F 17/30* (2006.01)
  *G06Q 50/30* (2012.01)
  *G08G 1/127* (2006.01)

(52) U.S. Cl.
  CPC ........... *G06Q 50/30* (2013.01); *G07B 15/063* (2013.01); *G08G 1/127* (2013.01)

(58) Field of Classification Search
  CPC .............. G06F 17/30112; G06Q 50/30; G06Q 30/0201; G06Q 10/02; G06Q 10/025; G07B 15/063; G01C 21/36; G02F 1/133308
  See application file for complete search history.

(56) References Cited

U.S. PATENT DOCUMENTS

| | | | | |
|---|---|---|---|---|
| 8,340,904 | B2* | 12/2012 | Lin | G08G 1/123 340/994 |
| 8,643,512 | B2* | 2/2014 | Hsieh | G08G 1/133 340/994 |
| 9,441,981 | B2* | 9/2016 | Abhyanker | G01C 21/36 |
| 9,736,643 | B2* | 8/2017 | Lin | H04W 4/023 |
| 9,763,058 | B2* | 9/2017 | Chiu | H04W 4/029 |
| 2001/0037174 | A1* | 11/2001 | Dickerson | G07B 15/00 701/400 |
| 2007/0197231 | A1* | 8/2007 | Lin | G08G 1/123 455/456.1 |
| 2011/0225859 | A1* | 9/2011 | Safavi | G02F 1/133308 40/448 |
| 2013/0158846 | A1* | 6/2013 | Zhang | G08G 1/123 701/117 |
| 2015/0106159 | A1* | 4/2015 | Hong | G06Q 30/0201 705/7.29 |
| 2015/0294431 | A1* | 10/2015 | Fiorucci | G06Q 50/26 705/13 |
| 2017/0169366 | A1* | 6/2017 | Klein | G06Q 10/025 |
| 2018/0197418 | A1* | 7/2018 | Chu | G06Q 10/02 |

OTHER PUBLICATIONS

Sutar et al., Integration of Smart Phone and IOT for development of Smart Public Transportation System, 2016, IEEE, p. 73-78 (Year: 2016).*

Camacho et al., A Wireless Infrastructure for Delivering Contextual Services and Studying Transport Behavior, 2010, IEEE, p. 943-948 (Year: 2010).*

Lu et al., Design of Mobile Electronic Bus Station Board Based on BPEL, 2014, IEEE, p. 75-78 (Year: 2014).*

* cited by examiner

QUERY SYSTEM FOR CROWDEDNESS OF BUS AND METHOD THEREOF

CROSS-REFERENCE TO RELATED APPLICATION

This application claims the benefit of Chinese Patent Application No. 201611163040.3, filed Dec. 15, 2016.

BACKGROUND OF THE INVENTION

Field of the Invention

The present disclosure relates to a query system and a method thereof, more particularly to a query system for crowdedness of the bus to query the number of passengers waiting for a bus, and a method thereof.

Description of the Related Art

In recent years, with rapid development and popularization of network, various applications based on network are available in market, such as a smart bus station.

Generally, conventional smart bus station may provide messages including estimated arrival times and current positions of buses. However, in the rush hour, passengers may spend time to wait for a bus but the arriving bus is usually full. The conventional smart bus station is unable to display crowdedness of the bus for the passenger to decide whether to wait for the coming bus, so that the passengers may waste time in waiting.

In order to solve aforementioned problem, there is a company providing a real-time bus information system which displays current positions of all buses traveling on the same bus routes in real time, so that the passenger is able to decide whether to wait for next bus according to the current positions of all buses if the coming bus is full. However, this system is unable to display crowdedness of the buses, so the passenger may waste time in waiting if several consecutive buses are full. As a result, the real-time bus information system may not solve aforementioned problem.

Therefore, what is need is to develop a query system which is able to display crowdedness of the bus for the passenger to decide whether to wait for the bus.

SUMMARY OF THE INVENTION

In order to solve aforementioned problem, the present disclosure is to provide a query system for crowdedness of bus, and a method thereof.

According to an embodiment, a query system for crowdedness of bus may be applied in environment having at least one bus route which comprises a plurality of bus stations and at least one bus thereon, and the query system includes at least one mobile device and a server-end device. Each mobile device includes a selection module and a query module. The selection module is configured to select one of the at least one bus route, and then continuously receive a bus dynamic message corresponding to the selected bus route, and display the bus dynamic message. The query module is configured to transmit a passenger pick-up request message comprising a target bus, a waiting position and a destination, and then continuously receive the numbers of passengers on the target bus for display with the bus dynamic message. The server-end device includes a passenger pick-up request message database, a transmission module, and a calculation module. The passenger pick-up request message database is configured to store the passenger pick-up request message from the at least one mobile device. The transmission module is configured to link with a real-time bus information system to continuously download the bus dynamic message corresponding to the selection inputted through the at least one mobile device. The bus dynamic message is displayed on the at least one mobile device for browse. The calculation module configured to calculate the numbers of passengers on the same target bus respectively reaching the plurality of bus stations according to the passenger pick-up request message of each mobile device stored, and transmit the numbers of passengers to corresponding mobile device through the transmission module.

According to an embodiment, a query method for crowdedness of bus may be applied in environment having at least one bus route which comprises a plurality of bus stations and at least one bus thereon, and the query method includes following steps: linking a server-end device to a real-time bus information system; after one of the at least one bus routes is selected through at least one mobile device, continuously downloading, by the server-end device, a bus dynamic message corresponding to the selected bus route from the real-time bus information system for browse on the mobile device; receiving and displaying, by the mobile device, the bus dynamic message corresponding to the selected bus route, and transmitting a passenger pick-up request message, which comprises a target bus, a waiting position and a destination, to the server-end device; receiving and storing, by the server-end device, the passenger pick-up request message from the at least one mobile device, and calculating numbers of passengers on the target bus reaching the plurality of bus stations respectively according to the passenger pick-up request message of each mobile device stored, and transmitting the numbers of passengers to corresponding mobile device; and receiving, by the at least one mobile device, the numbers of passengers on the target bus, and displaying the bus dynamic message and the numbers of passengers at the same time.

According to aforementioned content, the difference between the present disclosure and the conventional technology is that, in the query system and method of the present disclosure, the passenger may select the bus route displayed on the mobile device, to download and browse the bus dynamic message corresponding to the selected bus route, and then input and transmit the passenger pick-up request message to the server-end device, and the server-end device stores the passenger pick-up request message and calculates the numbers of passengers on the bus reaching all bus stations according to the passenger pick-up request messages of all mobile devices, and the numbers of passengers and the bus dynamic message are displayed on the passenger's mobile device at the same time.

Therefore, the technical means of the present disclosure may achieve a technical effect of improving efficiency in selecting the bus to take.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

Figure 1:
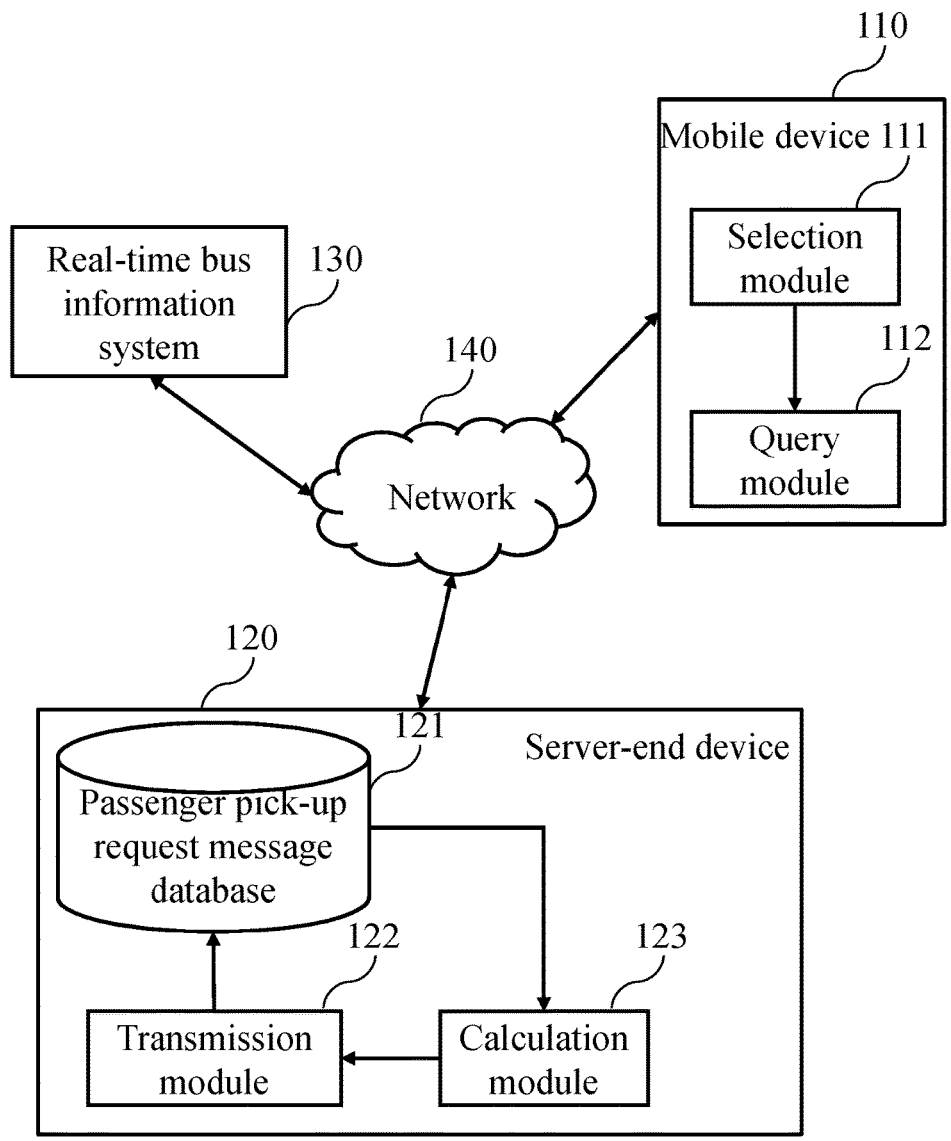
FIG. 1 is a system block diagram of a query system for crowdedness of a bus, in accordance with the present disclosure.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

Definitions of terms used in the present disclosure are explained prior to description of the query system for crowdedness of bus and the method thereof of the present disclosure. A bus station described in the present disclosure means a location where a bus station sign is disposed. Generally, there are multiple bus stations built along a bus route for passengers to wait for and take on/off bus. For a current bus station, the number of passengers on a bus means a sum of the numbers of passengers waiting for the bus at all bus stations before the current bus station which the bus arrives, or the sum plus the number of passengers waiting at the current bus station. It should be noted that the number of passengers on a bus does not mean the number of passenger waiting at single bus stations.

A query system for crowdedness of bus and a method thereof of the present disclosure will hereinafter be described in more detail with reference to the accompanying drawings. FIG. 1 is a system block diagram of the query system for crowdedness of bus, in accordance with the present disclosure. The query system may be applied in environment having at least one bus route, and each bus route includes multiple bus stations and at least one bus thereon. The system includes a mobile device 110 and a server-end device 120. In the actual implementation, the mobile device 110 and the server-end device 120 are linked with each other through network 140. Preferably, the mobile device 110 may be a smartphone, a notebook computer, a tablet computer and so on. The server-end device 120 may be a computing device, such as a personal computer, a server, a cluster server, and so on.

The mobile device 110 includes a selection module 111 and a query module 112. The selection module 111 is configured to provide a passenger to select one of selectable bus routes, and then continuously receive and display a bus dynamic message corresponding to the selected bus route. In the actual implementation, the mobile device 110 may display a graphic user interface (GUI) and the passenger may input a target bus which the passenger wants to take, a waiting position and a destination, so that the mobile device 110 may generate a passenger pick-up request message. It is to be noted that the mobile device 110 may generate and transmit a passenger pick-up request message to the server-end device 120 every time the target bus, the waiting position and the destination are inputted. Furthermore, the bus dynamic message may include a current positions of each of all buses and estimated arrival times of each bus for different bus stations, and these buses are respectively displayed as image icons (such as bus icons) at the current positions. After the passenger clicks one of the bus icons, the mobile device 110 sets the bus at the current position corresponding to the clicked bus icon to be the target bus which the passenger is waiting for.

The query module 112 is configured to transmit the passenger pick-up request message which includes the target bus, the waiting position and the destination. After transmitting the passenger pick-up request message, the query module 112 continuously receives the number of passengers waiting for the target bus, and displays the number of passengers and the bus dynamic message. In the actual implementation, the number of passengers may be schematically represented by a crowdedness icon which is displayed with a different color according to the number of passengers, and the crowdedness icon is displayed on the graphic user interface of the mobile device 110.

The server-end device 120 includes a passenger pick-up request message database 121, a transmission module 122 and a calculation module 123. The passenger pick-up request message database 121 is configured to store the passenger pick-up request message transmitted from each mobile device 110. In the actual implementation, the passenger pick-up request message database 121 may be a relational database, and use structured query language (SQL) as the database query language to query the passenger pick-up request message of each mobile device 110, and further execute add, deletion, modification and statistics processing. It is to be noted that when the same mobile device 110 transmits one or more passenger pick-up request message to the server-end device 120, the server-end device 120 may merely store the latest passenger pick-up request message for statistics.

The transmission module 122 is configured to link with a real-time bus information system 130 through network 140, to continuously download the bus dynamic message corresponding to the passenger's selection inputted through the mobile device 110, and the passenger may browse the downloaded bus dynamic message displayed on the mobile device 110. In the actual implementation, the real-time bus information system 130 may be a system built by the official traffic or transport unit, and provide an application programming interface (API), so that the transmission module 122 may be linked with the real-time bus information system 130 through the API to receive the bus dynamic message in real time.

The calculation module 123 is configured to calculate the number of passengers on the same target bus at each bus station according to the passenger pick-up request messages of all mobile devices 110 which are stored, and transmit the number of passengers to corresponding mobile devices 110 through the transmission module 122. In the actual implementation, the manner of calculating the number of passengers on the same target bus at specific bus station is to subtract the number of destinations set as other bus stations prior to the specific bus station from a sum of the numbers of waiting positions set as other bus stations prior to the specific bus station. For example, suppose that a bus route has five bus stations, the number of passengers on the bus at the second bus station is obtained by subtracting the number of the destinations set as the first bus station from the number of the waiting positions set as the first bus station. The number of passenger on the bus at the third bus station is calculated by subtracting the number of all destinations set as the first and second bus stations from the number of all waiting positions set as the first and second bus stations. The numbers of passengers on the bus at third to fifth bus stations may calculated by similar manner.

Figure 2:
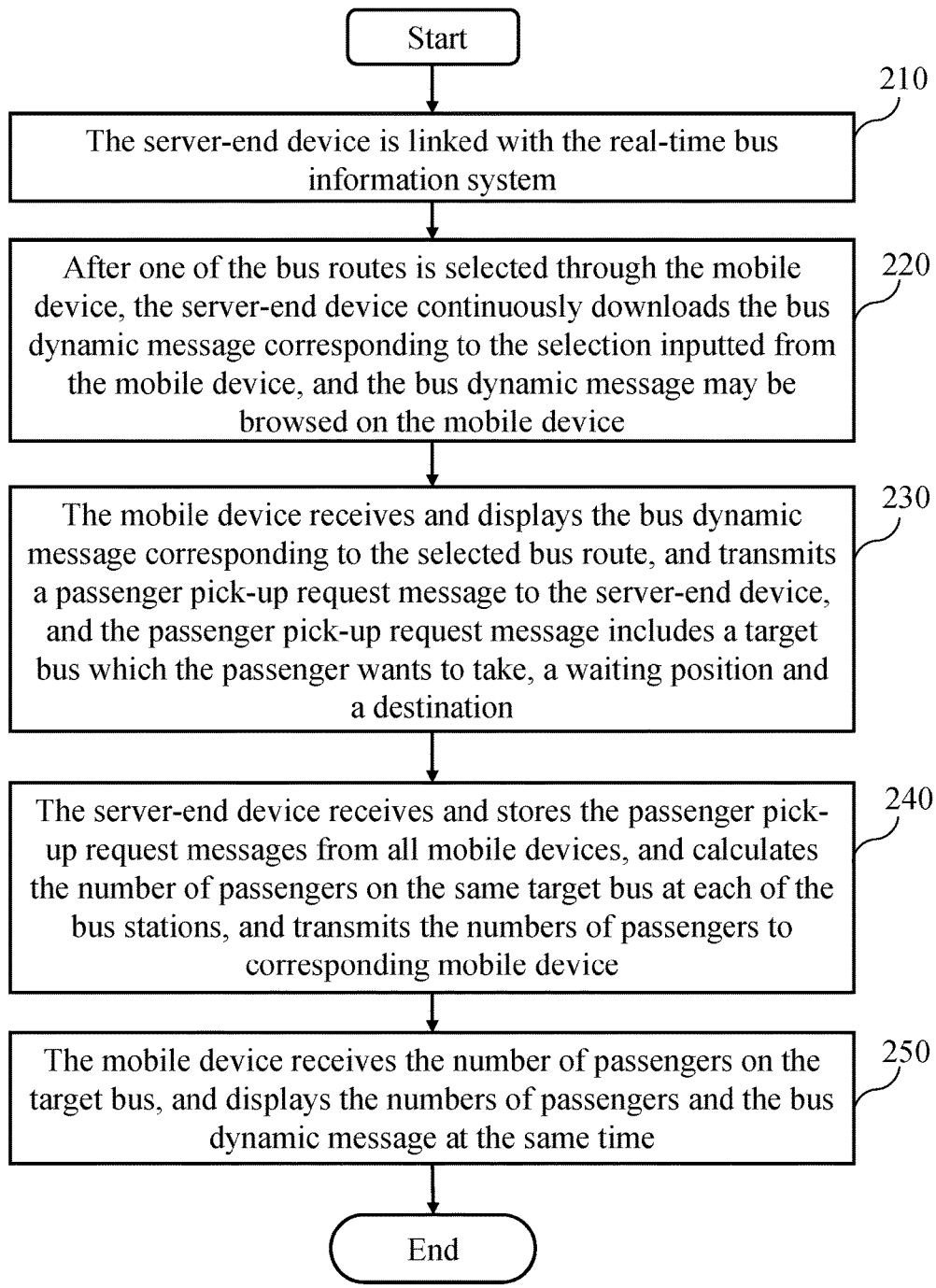
FIG. 2 is a flowchart showing the steps in an operation of a query method for crowdedness of the bus, in accordance with the present disclosure.

Please refer to FIG. 2, which is a flowchart showing the steps in an operation of query method for crowdedness of bus, in accordance with the present disclosure. The query method may be applied in environment having bus routes which each has multiple bus stations and multiple buses traveling thereon. The query method includes following steps. In step 210, the server-end device 120 is linked with the real-time bus information system 130. In a step 220, after one of the bus routes is selected through the mobile device 110, the server-end device 120 continuously downloads the bus dynamic message corresponding to the selection inputted from the mobile device 110, and the bus dynamic message may be browsed on the mobile device 110. In a step 230, the mobile device 110 continuously receives and displays the bus dynamic message corresponding to the selected bus route, and transmits a passenger pick-up request message to the server-end device 120. The passenger pick-up request message includes a target bus which the passenger wants to take, a waiting position and a destination. In s step 240, the server-end device 120 receives and stores the passenger pick-up request messages from all mobile devices 110, and calculates the number of passengers on the same target bus at each of the bus stations, and transmits the numbers of passengers to corresponding mobile device 110. In a step 250, the mobile device 110 continuously receives the numbers of passengers on the target bus, and displays the numbers of passengers and the bus dynamic message at the same time. Through aforementioned steps, the passenger may select the bus route through the mobile device 110 and then downloads and browse the bus dynamic message corresponding to the selected bus route, and then input and transmit the passenger pick-up request message to the server-end device 120; the server-end device 120 stores the passenger pick-up request messages to calculate the numbers of passengers on the target bus at all bus stations according to the passenger pick-up request messages of all mobile devices 110; and the mobile device 110 may display the numbers of passengers and the bus dynamic message at the same time.

Figure 3:
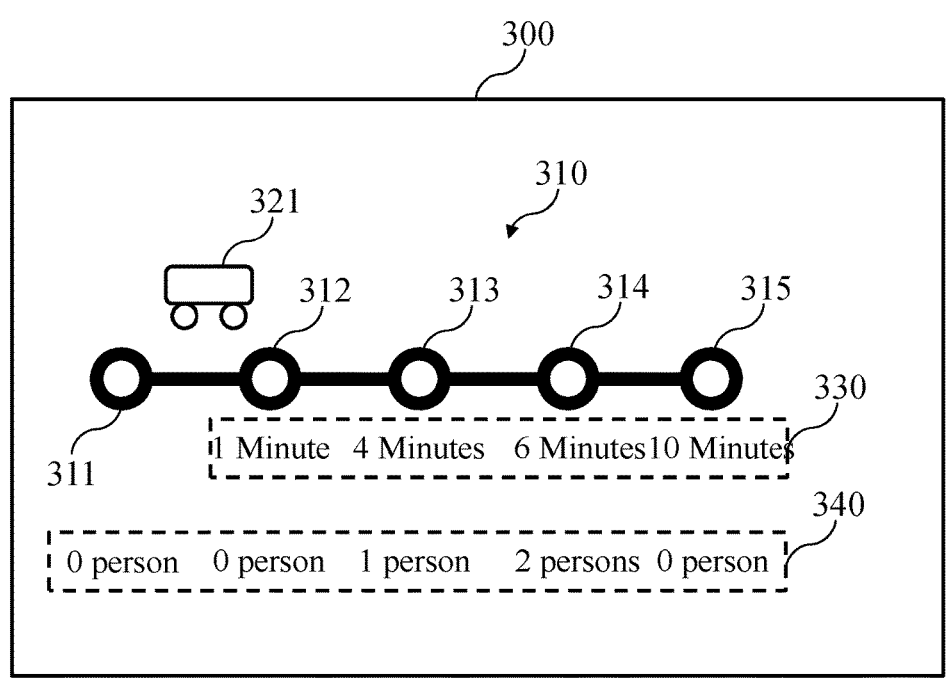
FIG. 3 is a schematic view of an application displaying the crowdedness of bus, in accordance with the present disclosure.
Figure 4:
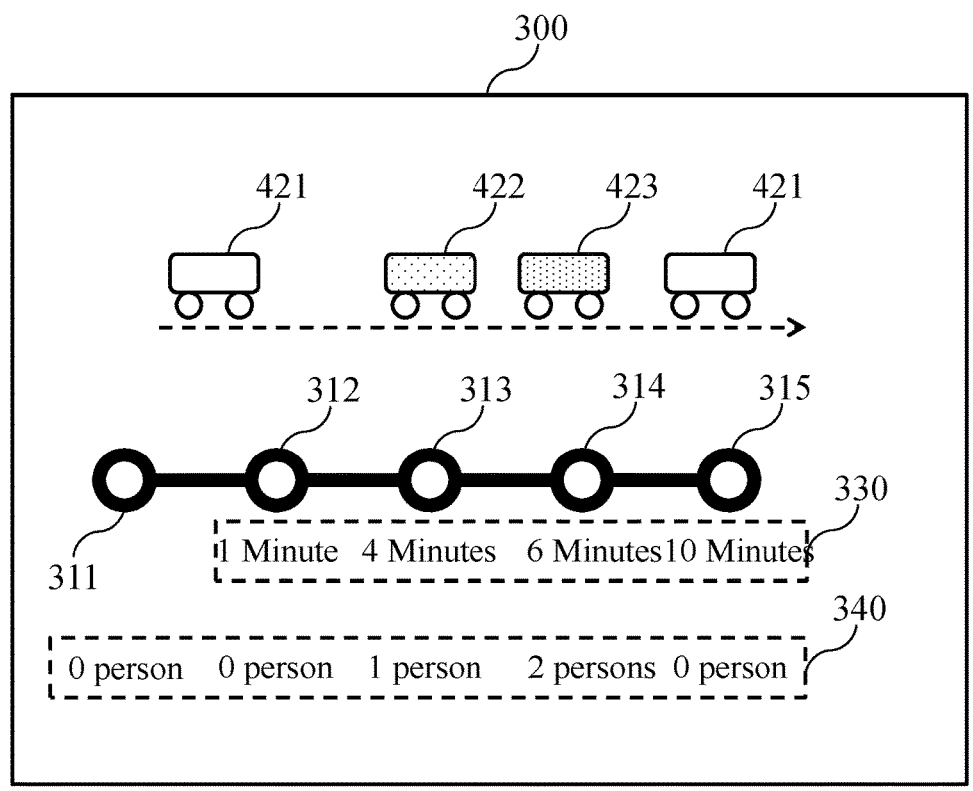
FIG. 4 is a schematic view of an application displaying different crowdedness icons correspondingly to different numbers of passengers, in accordance with the present disclosure.

The following describes embodiments for illustration of the present disclosure in cooperation with FIGS. 3 and 4. FIG. 3 is a schematic view showing the crowdedness of the bus, in accordance with the present disclosure. Suppose that the bus dynamic message of the real-time bus information system is for a bus route including five bus stations, and one bus is traveling along this bus route. When the passenger selects this bus route through the mobile device 110, the server-end device 120 is linked with the real-time bus information system 130 through network 140 to download the bus dynamic message corresponding to the selected bus route and then transmit the bus dynamic message to the mobile device 110. As shown in FIG. 3, the graphic user interface 300 of the mobile device 110 displays a bus route 310, five bus stations 311-315, a bus icon 321 and estimated arrival times 330 for all bus stations 311-315. A position of the bus icon 321 is changed according to actual position of the bus. The passenger may click the bus icon 321 to set this bus as the target bus, and then click one of the five bus stations (such as the bus station 312) to set the clicked bus station as the waiting position, and then click other bus station stops (such as the bus station 314) to set the other clicked bus station as the destination, and the mobile device 110 then generates a passenger pick-up request message corresponding to the passenger's selection and transmits the passenger pick-up request message to the server-end device 120.

The server-end device 120 receives and stores the passenger pick-up request messages from many mobile devices 110, and then calculates the number of passengers on the same target bus at each bus station (each one of the bus stations 311-315). For example, suppose that there are two passengers waiting for the same bus at bus stations 312 and 313 respectively, and they use their mobile devices 110 to generate the corresponding passenger pick-up request messages; in the former, the waiting position is the bus station 312 and the destination is the bus station 314, and in the latter, the waiting position is the bus station 313 and the destination is the bus station 314. According to the two passenger pick-up request messages, the server-end device 120 calculates the numbers of passengers on the target bus at the bus stations 311-315 are 0, 0, 1, 2 and 0, respectively. In detail, for the bus station 311, no passenger take the bus at the first bus station and the bus is empty in the beginning, so the number of passengers on the target bus reaching the bus station 311 is 0; for the bus station 312, one passenger is waiting for the bus at bus station 312 but is not picked up yet, so the number of passengers on the target bus reaching the bus station 312 is 0; for the bus station 313, a sum of the numbers of the waiting positions set as the bus stations 311 and 312 is 1, and a sum of the numbers of the destinations set as the bus stations 311 and 312 is 0, so the numbers of passengers on the target bus reaching the bus station 313 is 1, that is, 1 minus 0 equals 1; for the bus station 314, a sum of the numbers of the waiting positions set as the bus stations 311, 312 and 313 is 2, and a sum of the number of the destinations set as the bus stations 311, 312 and 313 is 0, so the numbers of the passenger on the target bus reaching the bus station 314 is 2, that is, 2 minus 0 equals 2; and for the bus station 315, a sum of the numbers of the waiting positions set as the bus stations 311, 312, 313 and 314 is 2, and a sum of the numbers of the destinations set as the bus stations 311, 312, 313, and 314 is 2, so the number of passengers on the bus reaching the bus station 315 is 0, that is, 2 minus 2 equals 0.

After the server-end device 120 calculates the numbers of passengers on the target bus at the bus stations 311-315, the server-end device 120 respectively transmits the numbers of passengers to the corresponding mobile devices 110, and the numbers of passengers and the bus dynamic message are displayed on the mobile device at the same time, as shown in FIG. 4, the numbers of passengers 340 are displayed correspondingly in position to the bus stations, respectively. It is to be noted that the way of calculating the numbers of passengers of the present disclosure is not limited to aforementioned exemplary illustration. For example, according to the passenger pick-up request messages, the server-end device 120 may calculate the numbers of passengers on the target bus at bus stations 311-315 as 0 (no passenger take the bus at the first bus station and the bus is empty in the beginning), 1 (the passenger waiting for the target bus at bus station 312 is counted), 2 (a sum of the numbers of the waiting positions set as the bus stations 311, 312 and 313 is 2, and the number of the destinations set as the bus stations 311, 312 and 313 is 0, so the numbers of passenger on the target bus reaching the bus station 313 is 2, that is, 2 minus 0 equals 2), 0 (a sum of the numbers of the waiting positions set as the bus stations 311, 312, 313 and 314 is 2, and the number of the destinations set as the bus stations 311, 312, 313 and 314 is 2, so the numbers of passengers on the target bus reaching the bus station 314 is 0, that is, 2 minus 2 equals 0), 0 (a sum of the numbers of the waiting positions set as the bus stations 311, 312, 313, 314 and 315 is 2, and a sum of the numbers of the destinations set as the bus stations 311, 312, 313, 314 and 315 is 2, so the number of passengers on the target bus reaching the bus station 315 is 0, that is, 2 minus 2 equals 0), respectively. As a result, the passenger holding the mobile device 110 may determine crowdedness of the target bus according to the numbers of passengers on the bus at all bus stations, and then perform selection based on the crowdedness of the bus, for example, the passenger may determine to wait the bus on the same bus route, or change to other bus route, or the like.

Please refer to FIG. 4, which is a schematic view of an application displaying different crowdedness icons correspondingly to different numbers of passengers, in accordance with the present disclosure. In FIG. 4, the different numbers of passengers are represented by crowdedness icons with different colors. For example, suppose that the numbers of passengers on the bus at the bus stations 311-315 are 0, 0, 1, 2 and 0, respectively. The number of the passenger being 0 may be displayed by the crowdedness icon 421 with white color; the number of the passenger being 1 may be displayed by the crowdedness icon 422 with green color (indicated by few dots in FIG. 4); the crowdedness icon 423 corresponding to the number of passenger being 2 may be displayed by yellow color (indicated by many dots in FIG. 4). In FIG. 4, the different colors are schematically shown by different halftime, respectively. In other words, the crowdedness icon 421 corresponding to the empty bus is displayed by white color; the crowdedness icon 422 corresponding to the bus carrying a small number of passengers is displayed by green color; The crowdedness icon 423 corresponding to the crowded bus is displayed by yellow color; and the crowdedness icon corresponding to the bus full with passengers is displayed by red color (not shown in FIG. 4).

To summarize, the difference between the present disclosure and the conventional technology is that, in the query system and method of the present disclosure, the passenger may select the bus route displayed on the mobile device 110, to download and browse the bus dynamic message corresponding to the selected bus route, and then input and transmit the passenger pick-up request message to the server-end device 120, and the server-end device 120 stores the passenger pick-up request message and calculates the numbers of passengers on the bus reaching all bus stations according to the passenger pick-up request messages of all mobile devices 110, and the numbers of passengers and the bus dynamic message are displayed on the passenger's mobile device 110 at the same time. Therefore, the technical means of the present disclosure may solve the problems of the conventional technology, and achieve a technical effect of improving efficiency in selecting the bus to take.

The present disclosure disclosed herein has been described by means of specific embodiments. However, numerous modifications, variations and enhancements can be made thereto by those skilled in the art without departing from the spirit and scope of the invention set forth in the claims.

What is claimed is:

1. A query system for crowdedness of bus, applied in environment having at least one bus route which comprises a plurality of bus stations and at least one bus thereon, and the query system comprising:
   at least one mobile device, each comprising:
      a selection module, configured to select one of the at least one bus route, and then continuously receive a bus dynamic message corresponding to the selected bus route, and display the bus dynamic message; and
      a query module configured to transmit a passenger pick-up request message comprising a target bus, a waiting position and a destination, and then continuously receive the numbers of passengers on the target bus for display with the bus dynamic message; and
   a server-end device comprising:
      a passenger pick-up request message database configured to store the passenger pick-up request message from the at least one mobile device;
      a transmission module configured to link with a real-time bus information system, and continuously download the bus dynamic message corresponding to the selection inputted through the mobile device, wherein the bus dynamic message is displayed on the mobile device for browse; and
      a calculation module configured to calculate the numbers of passengers on the same target bus respectively reaching the plurality of bus stations according to the passenger pick-up request message from the at least one mobile device stored, and transmit the numbers of passengers to corresponding mobile device through the transmission module.

2. The query system for crowdedness of bus according to claim 1, wherein the at least one mobile device provides a graphic user interface to input the target bus, the waiting position and the destination, to generate the passenger pick-up request message.

3. The query system for crowdedness of bus according to claim 1, wherein the bus dynamic message comprises a current position of the at least one bus and estimated arrival times of the at least one bus for the plurality of bus stations respectively, and an icon is displayed correspondingly to the current position of the at least one bus, and when the icon is clicked, the bus at the current position corresponding to the icon is selected as the target bus.

4. The query system for crowdedness of bus according to claim 1, wherein the number of passengers is displayed by a crowdedness icon, and the crowdedness icon is displayed with different color correspondingly to different number of the passengers.

5. The query system for crowdedness of bus according to claim 1, wherein the calculation module calculates the number of passengers on the target bus reaching a specific bus station by subtracting a sum of the numbers of the destinations set as other bus stations prior to the specific bus station from a sum of the numbers of the waiting positions set as other bus stations prior to the specific bus station.

6. A query method for crowdedness of bus, applied in environment having at least one bus route which comprises a plurality of bus stations and at least one bus thereon, and the query method comprising:

linking a server-end device to a real-time bus information system;

after one of the at least one bus routes is selected through at least one mobile device, continuously downloading, by the server-end device, a bus dynamic message corresponding to the selected bus route from the real-time bus information system for browse on the mobile device;

receiving and displaying, by the mobile device, the bus dynamic message corresponding to the selected bus route, and transmitting a passenger pick-up request message, which comprises a target bus, a waiting position and a destination, to the server-end device;

receiving and storing, by the server-end device, the passenger pick-up request message from the at least one mobile device, and calculating numbers of passengers on the target bus reaching the plurality of bus stations respectively according to the passenger pick-up request message from the at least one mobile device stored, and transmitting the numbers of passengers to corresponding mobile device; and receiving, by the at least one mobile device, the numbers of passengers on the target bus, and displaying the bus dynamic message and the numbers of passengers at the same time.

7. The query method for crowdedness of bus according to claim 6, wherein the at least one mobile device provides a graphic user interface to input the target bus, the waiting position and the destination, to generate the passenger pick-up request message.

8. The query method for crowdedness of bus according to claim 6, wherein the bus dynamic message comprises a current position of the at least one bus and estimated arrival times of the at least one bus for the plurality of bus stations respectively, and an icon is displayed correspondingly to the current position of the at least one bus, and when the icon is clicked, the bus at the current position corresponding to the icon is selected as the target bus.

9. The query method for crowdedness of bus according to claim 6, wherein the number of passengers is displayed by a crowdedness icon, and the crowdedness icon is displayed with different color correspondingly to different number of the passenger.

10. The query method for crowdedness of bus according to claim 6, wherein the step of calculating the number of passengers on the target bus reaching one specific bus station of the plurality of bus stations comprises:

subtracting a sum of the numbers of destinations set as other bus stations prior to the specific bus station from a sum of the numbers of the waiting positions set as other bus stations prior to the specific bus station.

* * * * *